(No Model.)

C. E. VAIL.
COAT HOOK.

No. 486,187. Patented Nov. 15, 1892.

Witnesses
Inventor
C. E. Vail
By Figdon & Figdon
Attorneys.

UNITED STATES PATENT OFFICE.

CHARLES E. VAIL, OF SALT LAKE CITY, UTAH TERRITORY.

COAT-HOOK.

SPECIFICATION forming part of Letters Patent No. 486,187, dated November 15, 1892.

Application filed July 1, 1892. Serial No. 438,699. (No model.)

*To all whom it may concern:*

Be it known that I, CHARLES E. VAIL, a citizen of the United States, residing at Salt Lake City, in the county of Salt Lake and Territory of Utah, have invented certain new and useful Improvements in Hat and Coat Hooks; and I do hereby declare that the following is a full, clear, and exact description of the invention, which will enable others skilled in the art to which it appertains to make and use the same.

This invention relates to hat and coat hooks; and it has for its object to provide simple and improved locking means therefor, whereby articles suspended therefrom may be locked against removal.

A further object of the invention is to provide an improved hook of this character, which will possess advantages in point of inexpensiveness and durability in construction, ease of operation, and general efficiency.

Figure 1:
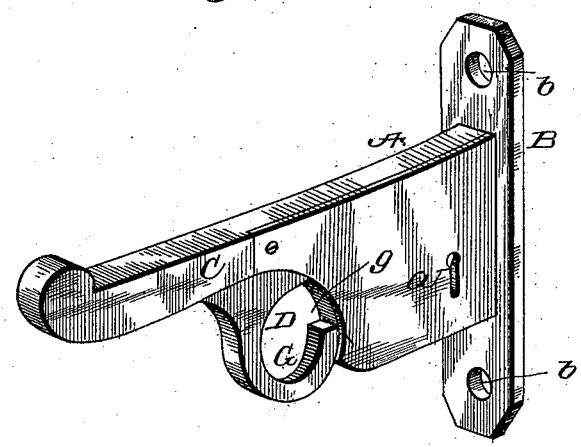
Figure 2:
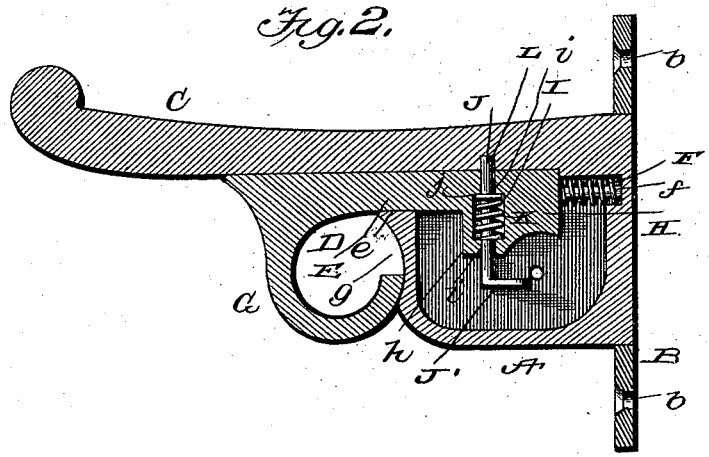
Figure 3:
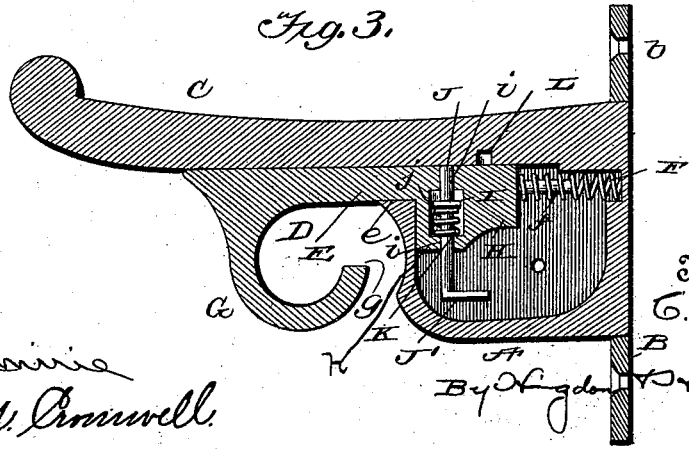

In the drawings, Figure 1 is a perspective view of a hat and coat hook embodying my invention. Fig. 2 is a vertical longitudinal sectional view thereof, the sliding hook being shown in a locked position. Fig. 3 is a similar view illustrating the sliding hook in unlocked position.

Corresponding parts in all the figures are denoted by the same letters of reference.

Referring to the drawings, A designates a casing, which is provided with a base-plate B, formed with screw-apertures $b$. From the upper edge of the casing A projects outwardly a suspending arm C, which may be of any suitable or desired formation.

D designates the sliding or locking hook, which comprises an arm E, passing through an opening $e$ in the casing, said arm being arranged parallel with the lower edge of the arm C and contacting therewith. In rear of the arm E and encircling a pin $f$ projecting therefrom is disposed a coil-spring F, the latter exerting its tension to force the hook D outwardly from the casing. At the outer end of the arm E is provided a ring G, cut away at its inner side, as at $g$, to form the suspending-hook. When the hook is in locked position, the ring G abuts against the casing A, and the opening in said ring is thus closed by the opposing edge of the casing.

For locking the hook D, I provide the mechanism which will now be described. The arm E is provided at or near its inner end with an enlargement H, forming a shoulder $h$, which limits the outward movement of the hook. The enlarged portion of the arm E is provided with a vertically-arranged recess I, and with two coincident apertures $i$ $i$, located, respectively, at the upper and lower ends of said recess. Within these apertures works a sliding bolt J, said bolt passing through the recess I. Disposed within the latter and encircling the bolt is a coil-spring K, said spring being interposed between the base of the recess I and a shoulder $j$, formed on the bolt near its upper end. The tension of this spring is thus exerted to force the sliding bolt upwardly, and when the hook D is in locked position this bolt engages an aperture L, in the top wall of the casing, and thus locks the hook against withdrawal. The lower end of the sliding bolt J is provided with a rearwardly-projecting arm J', which is located at right angles to the bolt and within the path of an unlocking-key.

In practice the key is inserted in a key-hole $a$, provided in one side of the casing. To unlock the hook, the key is turned to engage the upper side of the arm J', and by its continued movement the sliding bolt is withdrawn from the aperture L and the hook forced outwardly by the coil-spring F, thus rendering the hook accessible. When it is desired to lock the hook, the same is pushed inwardly until the sliding bolt coincides with the aperture L, when the said bolt will be caused to automatically engage with the latter and retain the hook against withdrawal.

I claim as my invention—

1. As an improvement in hat and coat hooks, the combination, with a casing provided with an opening $e$ and with an aperture L, of a hook D, comprising an arm E, working in said opening and provided within the casing with a transverse recess I and with two coincident apertures $i$, located at opposite sides of said recess, an L-shaped bolt J, working in said apertures and passing through said recess, said bolt being provided with a shoulder $j$, and a coil-spring K, encircling said bolt between the shoulder $j$ and the opposing wall of the recess I, substantially as and for the purpose set forth.

2. As an improvement in hat and coat hooks, the combination, with a casing provided with an opening e, of a hook D, comprising a ring G, open at its inner side, as at g, and an arm E, working in said opening and provided with an enlargement H, within the casing forming a stop-shoulder h, a spring-held locking-bolt J, working in said enlargement, a pin F, projecting rearward from the arm E, and a coil-spring f, encircling said pin and exerting its tension to force the hook outwardly, substantially as and for the purpose set forth.

3. The herein-described hat and coat hook, consisting of a casing A, provided with an opening e, and with an aperture L, a rigid arm C, projecting from said casing, a hook D, comprising a ring G, open at its inner side, as at g, and an arm E, working in said casing, said arm being provided with an enlargement H, having a transverse recess I, and apertures i, an L-shaped bolt J, working in said apertures and adapted to register with the aperture L, said bolt being provided with a shoulder j, a coil-spring K, encircling the bolt between the shoulder j and the opposing wall of the recess I, a pin F, projecting from the rear end of the arm E, and a coil-spring f, encircling said pin and exerting its tension to force the hook outwardly, all arranged and adapted to operate, substantially as and for the purpose set forth.

In testimony whereof I affix my signature in presence of two witnesses.

CHARLES E. VAIL.

Witnesses:
HIRAM E. BOOTH,
S. B. MEILNER.